United States Patent [19]

Driggers

[11] Patent Number: 4,819,742

[45] Date of Patent: Apr. 11, 1989

[54] VIBRATION-DAMPING CONTROL HANDLE FOR A PORTABLE POWER TOOL

[75] Inventor: Bernard M. Driggers, Shreveport, La.

[73] Assignee: White Consolidated Industries, Inc., Cleveland, Ohio

[21] Appl. No.: 62,059

[22] Filed: Jun. 12, 1987

[51] Int. Cl.[4] .............................................. B27B 17/02
[52] U.S. Cl. ..................................... 173/162.2; 30/276
[58] Field of Search ......................... 173/162.1, 162.2; 56/127; 30/276, 296 R, DIG. 5

[56] References Cited

U.S. PATENT DOCUMENTS

| | | | |
|---|---|---|---|
| 3,092,374 | 6/1963 | Krekeler | 262/33 |
| 3,140,746 | 7/1964 | Force | 173/162 |
| 3,224,473 | 12/1965 | Dobbertin et al. | 143/32 |
| 3,372,718 | 3/1968 | Irgens | 143/32 |
| 3,409,056 | 11/1968 | Rauh | 143/32 |
| 3,525,373 | 8/1970 | Kobayashi | 143/32 |
| 3,530,909 | 9/1970 | Scharpf | 143/32 |
| 3,542,095 | 11/1970 | Frederickson | 143/32 |
| 3,581,832 | 6/1971 | Heermann et al. | 173/162 |
| 3,620,269 | 11/1971 | Lange | 143/32 |
| 3,637,029 | 1/1972 | Sherwood, Jr. et al. | 173/162 |
| 3,651,839 | 3/1972 | Stihl et al. | 143/32 |
| 3,652,074 | 3/1972 | Frederickson | 267/137 |
| 3,680,608 | 8/1972 | Emmerich et al. | 143/32 |
| 3,698,455 | 10/1972 | Frederickson et al. | 143/32 |
| 3,700,015 | 10/1972 | Kobayashi et al. | 143/32 |
| 3,728,793 | 4/1973 | Makinson et al. | 30/383 |
| 3,733,700 | 5/1973 | Notaras et al. | 30/381 |
| 3,772,784 | 10/1973 | Heerman | 30/382 |
| 3,813,776 | 6/1974 | Frederickson et al. | 30/381 |
| 3,845,557 | 11/1974 | Bailey | 30/381 |
| 3,889,763 | 6/1975 | Dillon | 173/162 |
| 3,911,580 | 10/1975 | Bailey | 30/381 |
| 3,918,534 | 1/1976 | Fogelholm | 173/162 |
| 3,934,344 | 1/1976 | Inaga | 30/381 |
| 3,945,119 | 3/1976 | Nagashima et al. | 30/383 |
| 3,972,119 | 8/1976 | Bailey | 30/381 |
| 4,010,544 | 3/1977 | Siman | 30/381 |
| 4,041,606 | 8/1977 | Thompson | 30/381 |
| 4,135,301 | 1/1979 | Hoeppher | 30/381 |
| 4,138,812 | 2/1979 | Zimmerer et al. | 30/381 |
| 4,141,143 | 2/1979 | Hirschkoff et al. | 30/381 |
| 4,198,752 | 4/1980 | Bross | 30/381 |
| 4,202,096 | 5/1980 | Nagashima | 30/381 |
| 4,236,310 | 12/1980 | Muller | 30/381 |

OTHER PUBLICATIONS

Poulan Chain Saw Parts List-Model 3400-02/80.
Homelite (Jacobson).
Weed Eater (Lawn & Garden Tools 1984), Beaird-Poulan/Weed Eater-Emerson Electric Co.-08/83.

Primary Examiner—Frank T. Yost
Assistant Examiner—James L. Wolfe
Attorney, Agent, or Firm—Hubbard, Thurman, Turner & Tucker

[57] ABSTRACT

A vibration-damping control handle connectable to the shaft portion of a portable power tool, such as a flexible line trimmer or the like, has an elongated, axially tapered body which coaxially circumscribes the shaft and has an operator handgrip section secured thereto. A first end portion of the body is spaced laterally outwardly from the shaft and is interlocked with a free end portion of a resilient damping member which circumscribes the shaft and is secured to a clamp member releasably locked on the shaft. The opposite end of the handle body is connected to the shaft in a slip-fit relationship therewith so that the body may be laterally pivoted or flexed relative to the shaft against the resilient resistance of the free end portion of the damping member which may be a coiled spring or an annular elastomeric element. In alternate embodiments of the handle the damping member clamp is deleted, so that the damping member is in a slip-fit engagement with the shaft, and is replaced with a specially designed pivot clamp secured to the shaft at the opposite end of the handle body and interlocked with such opposite handle body end. The pivot clamp precludes appreciable axial or rotational movement of the handle body relative to the shaft, but permits the body to be laterally pivoted about its connection to the pivot clamp.

47 Claims, 4 Drawing Sheets

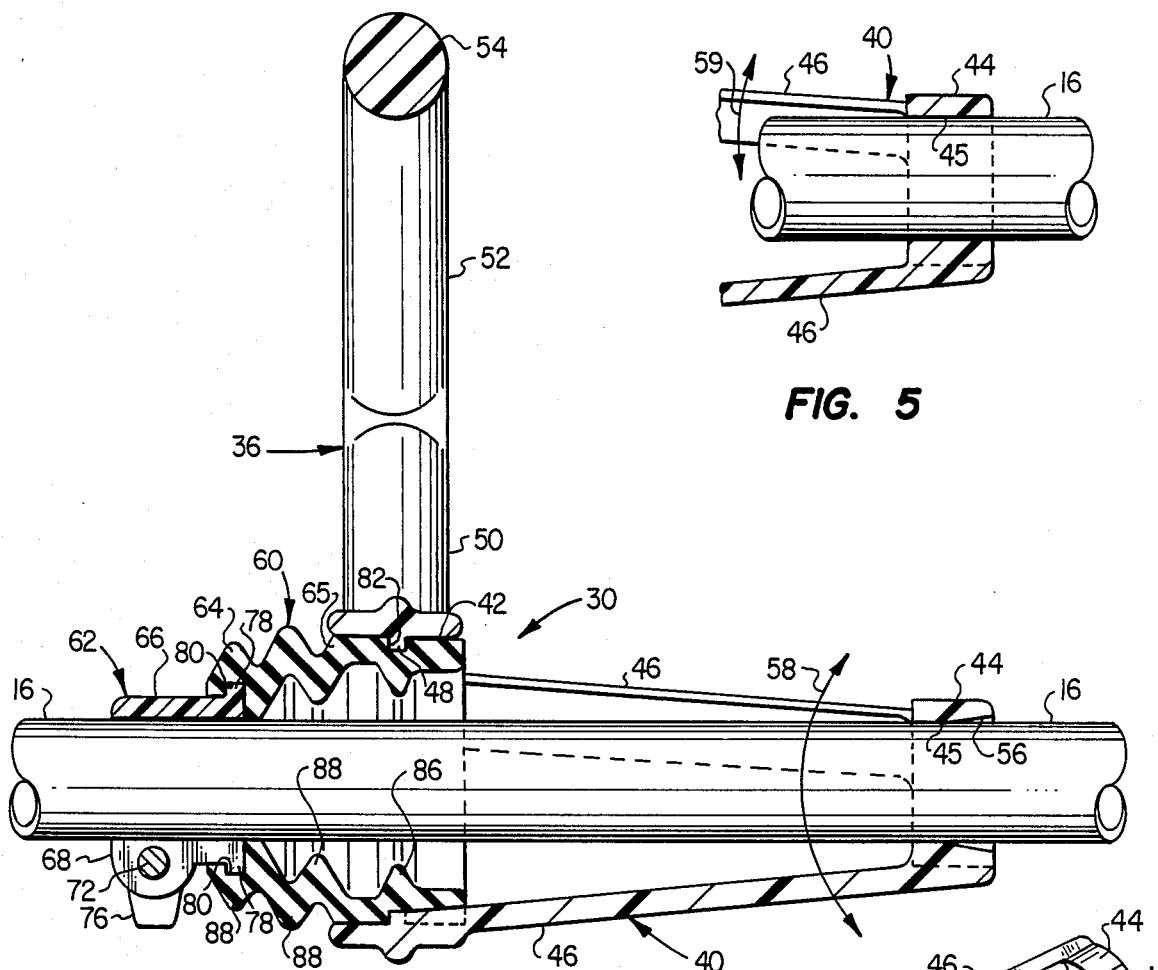
FIG. 5
FIG. 3
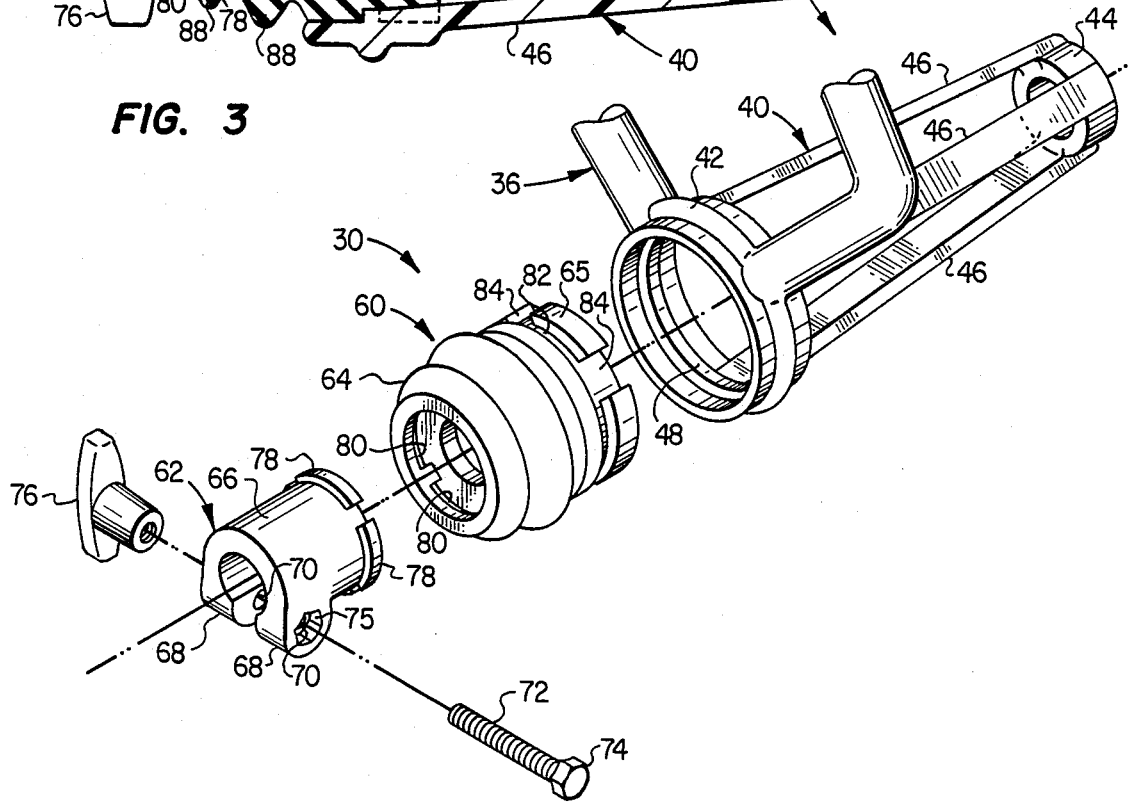
FIG. 4

VIBRATION-DAMPING CONTROL HANDLE FOR A PORTABLE POWER TOOL

BACKGROUND OF THE INVENTION

The present invention relates generally to portable power tools, and more particularly provides a unique vibration-damping control handle for use on portable rotary cutting tools such as flexible line trimmers, lawn edgers, or brush cutters, and other portable rotary power tools such as snow throwers, shaft-mounted blowers and the like.

Portable rotary cutting tools of the type mentioned are typically provided with a small internal combustion engine or electric motor which is connected to and spaced apart from a rotationally driven cutting element by an elongated hollow shaft through which a flexible drive shaft element extends for transmitting rotational power from the engine or motor to the cutting element. Such tools are also typically provided with a rear support handle connected to the engine or the shaft, and a forward control handle secured to the shaft. During operation of the tool, the operator grasps these handles to enable him to support the tool and appropriately guide the rotary cutting element.

In conventional power tools of this type, the forward control handle is rigidly connected to the shaft and projects generally laterally outwardly therefrom. During tool operation, shaft vibration is transmitted outwardly through the control handle to the handgrip portion thereof which is actually grasped by the tool operator. As is well known, such vibration transmitted to the handgrip can render operation of the tool, especially when it is used for extended continuous periods, quite uncomfortable, often causing a numbing sensation in the operator's hand.

Various attempts have been previously made to isolate the handgrip portion in the forward control handle from this shaft vibration. For example, it has been a common practice to utilize a resilient bushing to connect the hand grip portion to the balance of the forward control handle which is rigidly connected to the shaft, or to simply clamp an annular resilient bushing between the handle itself and the shaft directly beneath the handgrip portion to form a still relatively rigid interconnection between the handle and shaft. However, these conventional isolation techniques typically result in only a relatively small reduction in the shaft vibration ultimately transmitted to the handgrip.

Another proposed solution has been to provide the forward control handle with an open-looped configuration in which one of the loop ends is rigidly connected to the shaft, with the other loop end being free so that the handgrip portion defines a generally central section of the open loop. This control handle configuration renders the overall handle somewhat more flexible, thereby providing a slight additional reduction in the shaft vibration transmitted to the operator handgrip.

However, each of these conventional control handle designs, in common with other conventional handle designs, still often transmit an desirably high amount of shaft vibration the operator handgrip and thus to the operator's hand to provide an improved shaft-mounted control handle which will more substantially diminish shaft vibration transmitted to its handgrip portion.

SUMMARY OF THE INVENTION

In carrying out principles of the present invention, in accordance with a preferred embodiment thereof, an improved, vibration-damping control handle is provided for connection to the shaft of a rotary power hand tool such as a flexible line trimmer or the like. The handle has an elongated, axially tapered hollow body which is adapted to coaxially circumscribe the shaft. The handle body is provided at one end with a first annular attachment collar which outwardly circumscribes the shaft, and at the other end with a smaller diameter second attachment collar which circumscribes the shaft in a slip-fit engagement therewith. A suitable handgrip section is secured to the handle body adjacent the first attachment collar and is adapted to be grasped by an operator of the tool. The second attachment collar is provided with a suitably beveled interior surface which permits the handle body to be laterally pivoted relative to the shaft about the smaller diameter attachment collar. Alternatively, the internal surface bevel on the slip-fitted second attachment collar may be omitted so that the handle body may be laterally flexed relative to the shaft about such collar.

Lateral pivoting or flexure of the handle body is resisted by a resilient vibration damping member which is interconnected between the first attachment collar and the shaft. In one version of the control handle, the damping member is a hollow cylindrical elastomeric element which circumscribes the shaft and has an outer end portion that is secured to a clamp member releasably locked to the shaft axially outwardly of the first attachment collar. An inner, free end portion of the elastomeric element is cantilevered, spaced laterally outwardly of the shaft and is secured within the first attachment collar.

Alternatively, the resilient damping member may be in the form of a coiled spring member which coaxially circumscribes the shaft. The spring has an outer end portion defined by several coils which are closely wound around the shaft, the outermost one of these coils being provided with an axially outwardly projecting first tang portion which is secured to a metal clamping band releasably locked to the shaft. After the initial coils, which are closely wound around the shaft, the remainder of the spring coils progressively increase in both diameter and pitch to define a cantilevered inner end portion of the spring which terminates in an axially outwardly projecting second tang portion. The outermost enlarged spring coil, and the second tang portion, are respectively received and locked within corresponding circumferential and axial grooves formed in the inner surface of the first attachment collar of the handle body. Resilient damping members of other configurations could also be utilized if desired.

During use of the tool, transverse shaft vibration transmitted to the clamp member is absorbed and damped within the vibration damping member to thereby isolate the operator handgrip section of the handle from a substantial portion of such vibration. The smaller diameter attachment collar, which permits axial vibratory movement of the shaft relative thereto, functions to isolate the handle body from axial shaft vibration at its smaller diameter end. Transverse shaft vibration transmitted to the slip-fit end of the handle body tends to be absorbed and damped along the length of the body, particularly when the body is adapted to be flexed instead of pivoted about the smaller diameter, slip-fitted attachment collar.

This unique, two point resilient connection of the elongated handle body to the shaft greatly reduces the total amount of shaft vibration transmitted to the operator's hand via the handgrip section of the control handle. Since the handle body circumscribes the shaft, an added measure of safety is also provided. Specifically, if either of the two attachment structures breaks, the handle body still maintains the important connection between the handgrip and the shaft, allowing the operator at least reduced control of the shaft until he can turn the tool motor off.

In alternate embodiments of the control handle, the clamp to which the resilient damping member is fixedly secured is deleted so that the damping member is in a slip-fit engagement with the shaft. The deleted clamp is replaced with a specially designed pivot clamp assembly which is secured to the shaft at the opposite end of the handle body. The smaller end of the handle body is provided with a non-circular collar plate which is non-rotatably received and axially restrained within a complementarily configured slot formed in the clamp assembly. The slot is tapered to permit lateral pivoting of the handle body about its restrained collar plate.

If desired, the pivot clamp assembly may be replaced with a rigid clamp structure which is formed integrally with the smaller diameter end of the handle body. This modified clamp structure rigidly locks the smaller handle body end to the shaft and permits lateral flexure of the body relative to the clamp against the resilient resistance of the free end portion of the vibration damping member.

In each of the various embodiments of the control handle of the present invention, the handle body, the handgrip section and various of the previously described clamping mechanisms may be conveniently and inexpensively formed from a light weight molded plastic material. Axial and rotational adjustment of the handle on the shaft is easily and quickly effected simply by loosening the particular clamping mechanism, repositioning the handle as desired, and then retightening the clamp.

BRIEF DESCRIPTION OF THE DRAWINGS

FIG. 3 is an enlarged scale cross-sectional view through the control handle and a portion of the power tool shaft taken along line 3—3 of FIG. 2;

FIG. 4 is a fragmentary exploded view of the handle illustrating in more detail certain features of its various components;

FIG. 5 is a partial cross-sectional view through the body of the and illustrates an alternate, non-beveled rear connection collar portion thereof;

DETAILED DESCRIPTION

Figure 1:
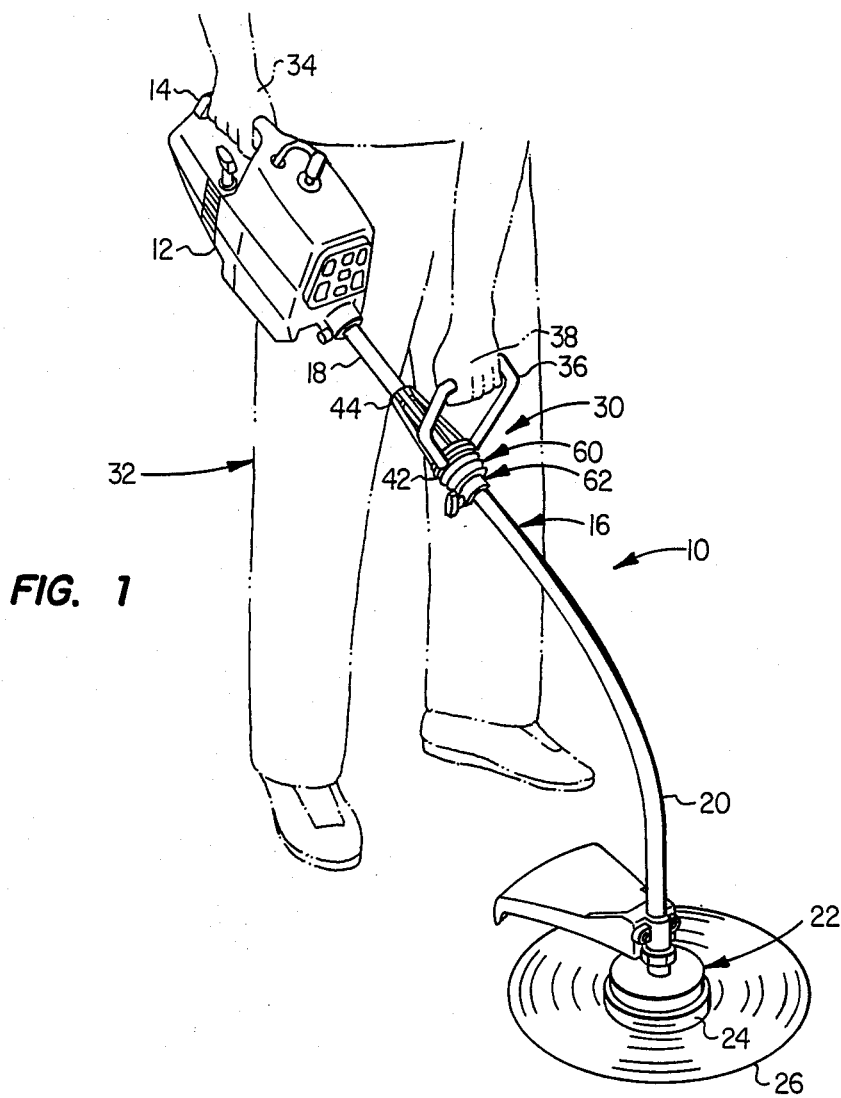
FIG. 1 is a perspective view of a representative gasoline-powered rotary cutting tool which incorporates therein a vibration-damping control handle that embodies principles of the present invention.

Perspectively illustrated in FIG. 1 is a representative portable rotary cutting tool in the form of a gasoline-powered flexible line trimmer 10 which includes a small gasoline engine 12 having a rear support handle 14 secured thereto, an elongated hollow shaft 16 operatively connected at its rear end 18 to engine 12 and having a downwardly curved forward end portion 20, and a rotary cutting head 22 operatively coupled to the downturned portion 20 of the shaft 16. It will be appreciated that the trimmer 10 could be provided with an electric motor instead of the gasoline engine, and that the shaft could be straight instead of curved.

The rotary head 22 includes a spool 24 and a length of flexible filament line 26 carried by the spool for cutting vegetation as the spool rotates. Rotational power is transmitted to the spool 24 by the engine 12 via a drive shaft (not illustrated) which extends through the interior of the shaft 16. The structure and operation of this internal flexible drive shaft, which forms no part of the present invention, are set forth in U.S. Pat. No. 4,451,983.

The present invention provides the trimmer 10 with a unique control handle 30 which is secured to the shaft 16, in a manner subsequently described, along a straight portion thereof disposed somewhat forwardly of the engine 12. During use of the trimmer 10, its operator 32 grasps the rear support handle 14 in one hand 34 while grasping a handgrip section 36 of the forward control handle 30 with his other hand 38. The control handle 30 is used to support and guide the motion of the shaft 16 to thereby accurately control the movements of the spool 24 and the rotating filament 26. As will be seen, the control handle 30 is flexibly connected to the shaft and uniquely functions to substantially reduce the amount of shaft vibration transmitted through the handle 30 to its handgrip 36.

Figure 2:
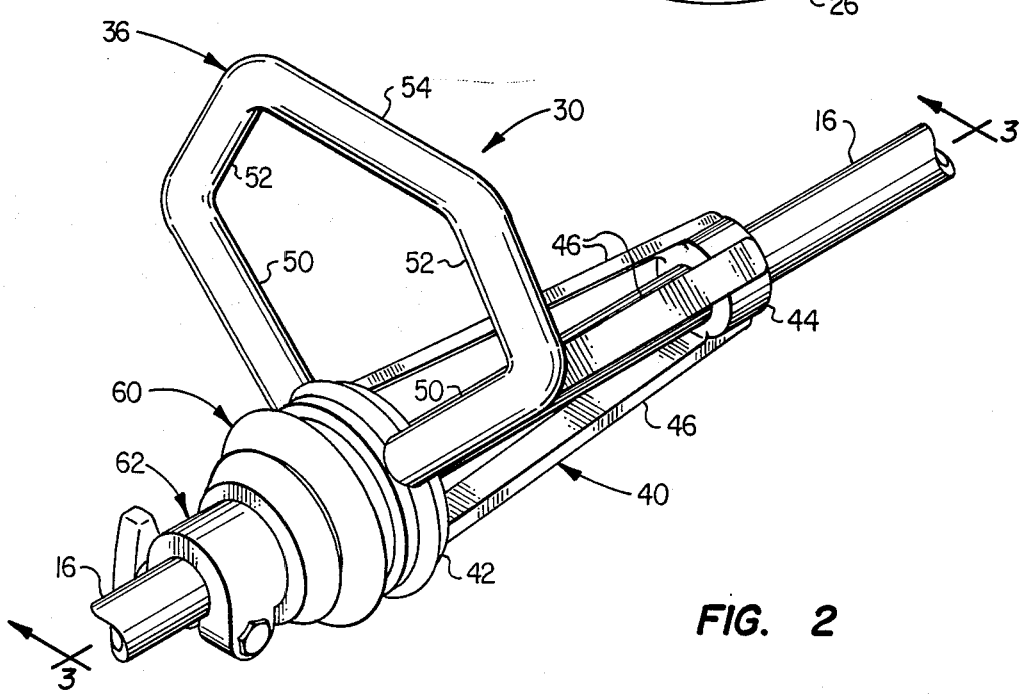
FIG. 2 is an enlarged scale perspective view of the control handle and a portion of the power tool shaft to which it is secured.

Referring now to FIGS. 2-4, the handle 30 has an elongated, molded plastic body section 40 which has a first end portion in the form of an annular collar 42 which outwardly circumscribes the shaft 16 in a laterally spaced relationship therewith, and a second end portion in the form of an annular collar 44 which circumscribes the shaft 16 and is in a slip-fit relationship therewith. As illustrated, the collar 42 faces forwardly toward the curved end portion 20 of the shaft 16, while the smaller diameter collar 44 faces rearwardly toward the engine 12. However, if desired, the orientation of the handle body section 40 could be reversed so that the larger diameter collar 42 faces the engine 12.

The collars 42 and 44 are intersecured in an axially spaced relationship along the shaft 16 by three circumferentially spaced, axially sloping connecting legs 46, each of which is secured at one end to the inner surface of the collar 42, and is secured at the opposite end to the outer surface of the collar 44. The circumferentially spaced ends of the legs 46 within the collar 42 are joined to an annular, interior flange 48 positioned therein. The multi-legged configuration of the handle body 40, which circumscribes the shaft 16, facilitates the internal molding of the annular flange 48. However, the body 40 could be given a variety of alternate cross-sections (for example, a hollow, generally conical shape) if desired.

The handgrip section 36, which is molded integrally with the handle body section 40, is defined by a pair of cylindrical arms 50 secured at their inner ends to the collar 42 and forming an obtuse angle with one another, a pair of cylindrical arms 52, each of which is connected at one end to the outer end of one of the arms 50 and forms an acute angle therewith, and a cylindrical arm 54 interconnected between the opposite ends of the arms 52. As will be subsequently described, the handle body 40 is releasably locked to the shaft 16 in a manner permitting it to be rotationally and axially adjusted relative to the shaft. However, it can be seen that the handgrip section 36, via the arms 50, 52 and 54, is provided with five essentially straight, mutually angled portions, any of which may be grasped by the operator 32, and moved to a horizontal position, to conveniently pivot the shaft 16 about the axis of its straight portion to thereby appropriately tilt the rotating filament 26 without the necessity of reorienting the handle 30 on the shaft 16. A variety of alternate configurations for the handgrip section 36 (such as a "handlebar" or bullhorn configuration) could, of course, be utilized if desired.

Adjacent its outer end, the interior surface 45 of the slip-fit collar 44 (FIG. 2) is provided with a circumferentially beveled portion 56 which permits the handle body section 40 to be laterally pivoted relative to the shaft 16 about the collar 44, in response to laterally directed operator hand forces exerted on the handgrip section 36, as indicated by the double-ended arrow 58 in FIG. 3. Alternatively, the bevel 56 may be eliminated so that the interior surface 45 of the slip-fit collar 44 is essentially flat (FIG. 5). With the bevel 56 eliminated, the handle body section 40 is restrained against pivotal motion about the collar 44, but may be resiliently flexed toward the shaft 16 about the slip-fit collar 44, in response to hand forces imposed upon the handgrip section 36, as indicated by the double-ended arrow 59 in FIG. 5.

Such lateral movement of the handle body section 40 (either pivotal or flexural) relative to the shaft 16 is resiliently resisted by a generally annular elastomeric vibration damping member 60 which circumscribes the shaft 16 and is intersecured between the larger diameter collar 42 and a clamping member 62 which is releasably anchored to the shaft 16 and positioned axially outwardly of the collar 42. The vibration damping member 60 has an outer end portion 64 which engages the shaft 16 and is interlocked with the clamping member 62, and a cantilevered inner end portion 65 which is spaced laterally outwardly of the shaft 16 and is interlocked with the collar 42.

The clamping member 62 has a split annular body 66 which is provided at one end with an opposed pair of locking ear portions 68 having circular openings 70 formed therethrough. A suitable locking bolt 72 is extended through the aligned openings 70 with its head 74 being nonrotatably received in a complementarily configured recess 75 formed in one of the clamp ears 68. The outer end of the bolt 72 is threadedly received in a T-nut member 76 which, when tightened, draws the ears 68 together to tighten the clamp body 66 around the shaft 16, thereby releasably anchoring the clamping member 62 on the shaft. The opposite end of the clamp body is provided around its periphery with a circumferentially spaced series of radially outwardly projecting, arcuate flange sections 78 which are received within circumferentially spaced grooves 80 formed around the radially inner periphery of the outer end portion 64 of the damping member 60. This interlock between the flange sections 78 and the interior surface grooves 80 of the damping member 60 prevents appreciable rotation or axial movement of the damping member 60 relative to the clamping member 62.

The cantilevered inner end portion 65 of the damping member 60 is similarly interlocked with the collar 42 by means of an annular groove 82 extending around the outer periphery of the damping member end portion 65 which receives the annular interior flange 48 of the collar 42. End portions of the three body legs 46 adjacent the interior flange 48 are received and restrained within correspondingly positioned exterior notches 84 formed in the end portion 65 and extending axially outwardly from the circumferential groove S2. The interlock between the internal flange 48 and the circumferential groove 82, and between the connecting legs 46 and the exterior notches 84, prevents the handle body 40 from moving axially or rotationally relative to the inner end portion 65 of the damping member 60. It can thus be seen that the clamping member 62 functions to positionally lock the handle 30 on the shaft 16. However, by loosening and then retightening the T-nut 76, it can be seen that the axial and rotational orientation of the handle 30 relative to the shaft 16 may be easily and quickly adjusted.

During use of the trimmer 10, a very substantial portion of the transverse shaft vibration transmitted to the rigidly connected clamping member 62 is absorbed and damped within the cantilevered elastomeric damping member 60 to thereby isolate the collar 42 and the handgrip section 36 from such vibration. The cantilevered damping member 60 provides an axial offset between the collar 42 and the clamping member 62 and functions as a cantilevered spring member to define a resilient, vibration-deadening path between the clamp member 62 and the collar 42. The slip-fit, smaller diameter collar 44, which defines a second connection location between the handle 30 and the shaft 16, permits the vibrating shaft 16 to oscillate axially relative to the collar 44. This slip-fit connection serves to substantially reduce the amount of axial shaft vibration which might otherwise be transmitted to the collar 44, and thus to the collar 42 via the connecting legs 46. The reduced axial shaft vibration transmitted to the collar 44 is further damped by the connecting legs 46, which also serve to absorb and damp transverse shaft vibration transmitted to the collar 44, prior to reaching the collar 42. Accordingly, because of the unique flexible connection of the handgrip section 36 to the shaft 16, the handgrip section is isolated from a very substantial portion of the shaft vibration which might otherwise be transmitted thereto. This provides the operator 32 with considerably enhanced hand comfort (as to the forward hand 38) compared to conventional forward control handles which are rigidly connected to the tool shaft at a single connection location.

During normal operation of the trimmer 10, except for the collar portion 44 thereof, the elongated handle body 40 which circumscribes the shaft is laterally isolated therefrom and may be laterally pivoted (or flexed, as the case may be) relative to the shaft, such lateral movement of the handle body relative to the shaft being resiliently resisted by the cantilevered end portion 65 of the damping member 60. More specifically, when only normal, relatively light hand control forces are exerted on the handle 30 this isolation is maintained. However, when it is necessary to exert a stronger hand force on the handle 30, in order to exert a stronger control force on the shaft 16, the handle body 40 may be laterally pivoted or flexed about the collar 44 to the extent that an annular interior rib portion 86 on the damping member end portion 65 engages the shaft 16. The rib 86 acts as a resilient stop portion of the handle 30 to limit the lateral movement of the handle body 40 relative to the shaft 16. When the rib 86 is brought into contact with the shaft 16, a more direct connection between the hand grip section 36 and the shaft 16 is achieved, thereby permitting a stronger hand force to be transmitted to the shaft. When the beveled portion 56 is omitted from the collar 44, so that the handle body 40 may be flexed about the collar 44 instead of pivoted about such collar, the interior rib 86 also functions to limit such lateral flexure to thereby automatically limit the bending stress opposed upon the handle body 40 to prevent inadvertent breakage thereof.

As previously mentioned, the elongated handle body 40 circumscribes an axial portion of the shaft 16. In addition to defining a portion of the flexible, vibration-damping interconnection between the handgrip section 36 and the shaft 16, the handle body 40 thus also functions as an important safety enhancement in the handle 30. Specifically, if during operation of the tool 10 breakage of any of the connecting portions of the handle (i.e., the clamp 62, the damping member 60 or the collar 44) occurs, the handle body 40 would still maintain the important connection between the handgrip section 36 and the shaft 16, to maintain at least a limited degree of forward hand control of the shaft until the engine 12 can be turned off.

It should be noted that, in addition to its interior stop rib 86, the damping member 60 is provided along its length with a series of alternately inwardly and outwardly projecting circumferential ribs 88. These ribs 88 function to reinforce the cantilevered end portion 65 to limit flattening thereof as the end portion 65 is laterally deflected relative to the shaft 16.

Figure 6:
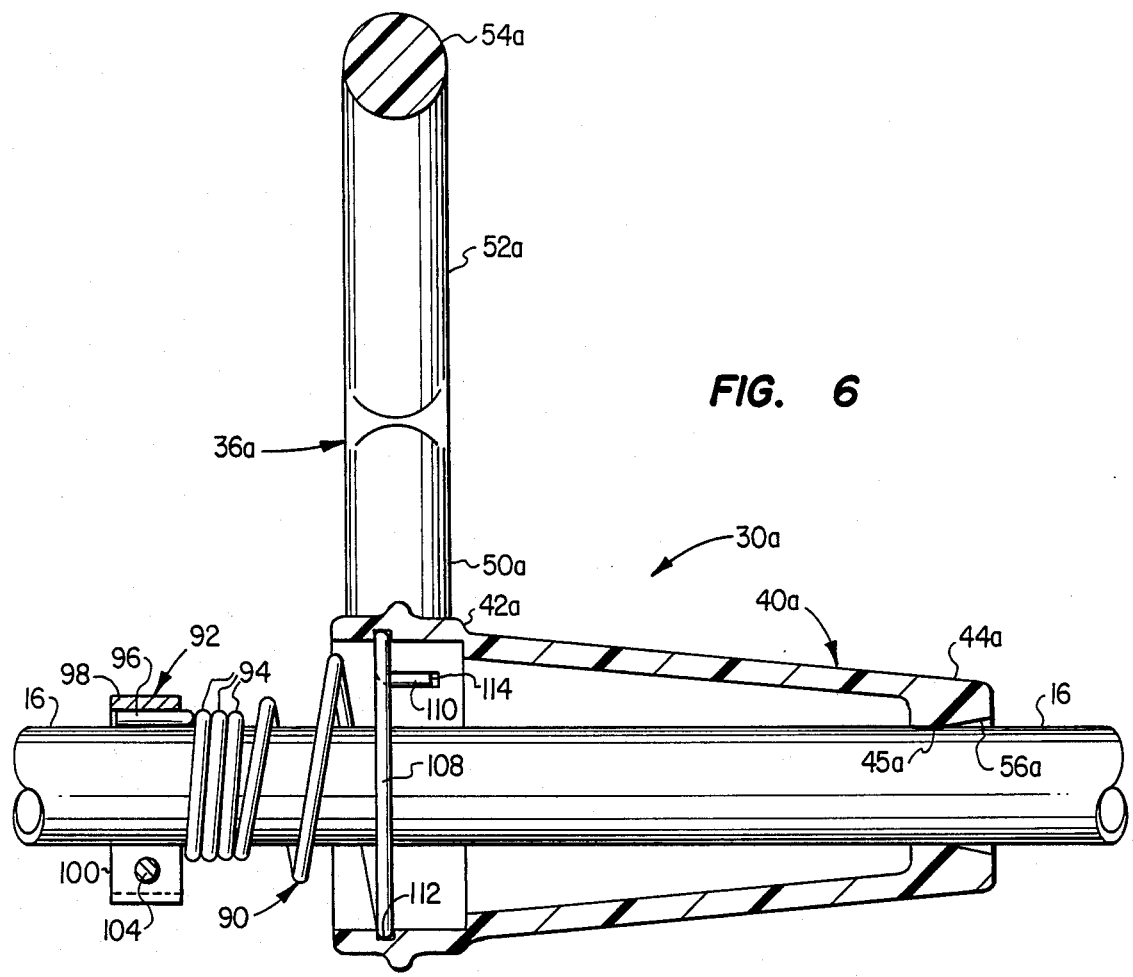
FIG. 6 is a cross-sectional view similar to that in FIG. 3, but illustrating, partially in elevation, an alternate embodiment of the control handle.
Figure 7:
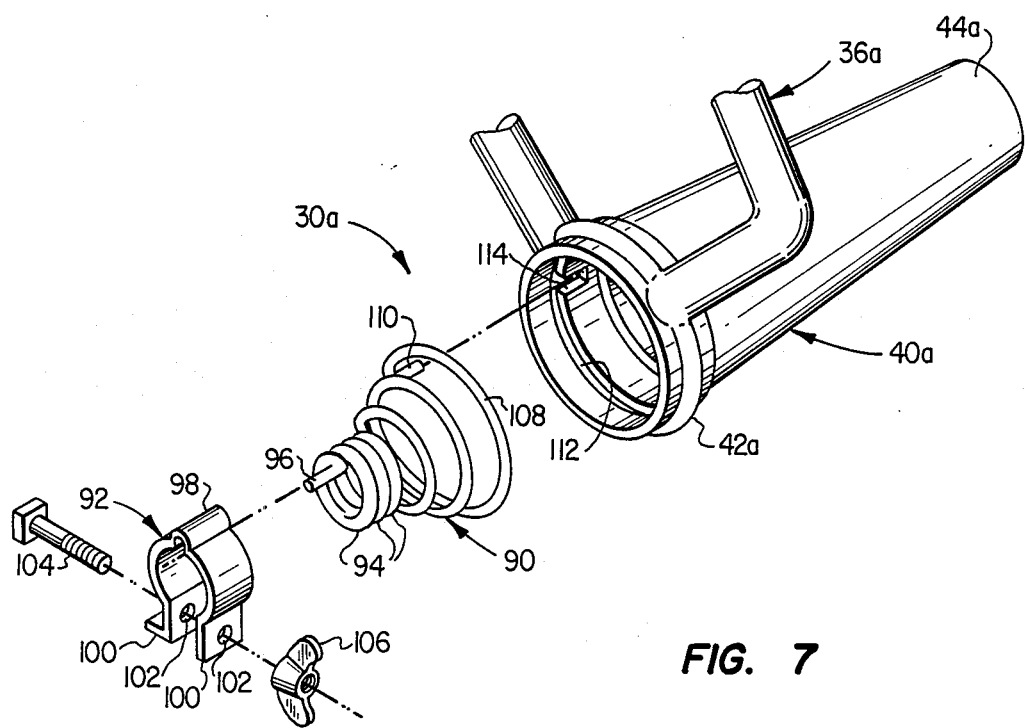
FIG. 7 is an exploded view of an end portion of the control handle depicted in FIG. 6.

Illustrated in FIGS. 6 and 7 is an alternate embodiment 30$_a$ of the control handle 30 in which elements similar to those in handle 30 have been given the same reference numerals, but with the subscript "a". The handle body 40$_a$ of the handle 30$_a$ has a hollow, generally tubular configuration, coaxially circumscribes the shaft 16, and is axially tapered between its connection to the larger diameter collar 42$_a$ and the smaller diameter collar 44$_a$ which engages the shaft in a slip-fit manner and is provided with the interior beveled surface 56$_a$ which permits the handle body 40$_a$ to be laterally pivoted relative to the shaft about the collar 44$_a$.

In the handle 30$_a$, the elastomeric damping member of the handle 30 is replaced with an alternate resilient damping member in the form of a coiled spring 90 which coaxially circumscribes the shaft 16 and is interconnected between the larger diameter collar 42$_a$ and a stamped metal clamping band 92 which is releasably anchored to the shaft 16 and positioned axially outwardly of the collar 42$_a$. The spring 90 has an outer end portion defined by several closely wound, essentially equal diameter coils 94 which closely circumscribe the shaft 16 and define a slip-fit connection between the spring 90 and the shaft. The outermost coil 94 is provided with an axially outwardly projecting tang portion 96 which is received and permanently secured, as by welding or soldering, within a radially outwardly projecting portion 98 of the clamping band 92. The clamping band 92 is provided with an opposed pair of connecting ears 100 having aligned circular openings 102 formed therethrough. To tighten the clamping band on the shaft 16, a connecting bolt 104 is extended through the holes 102 and connected to a wing nut member 106.

The remainder of the coils of the spring 90 define a second end portion thereof and progressively increase in both diameter and pitch, with the final coil 108 having an essentially constant diameter and being provided at its outer end with an axially outwardly projecting tang portion 110. The enlarged end coil 108 of the spring 90 is received within a circumferential slot 112 formed around the interior surface of the collar 42$_a$, and the tang 110 is received within an axially extending slot 114 also formed in the interior surface of the collar 42$_a$ and communicating with the circumferential slot 112. This interengagement between the spring coil 108 and the circumferential slot 112, and between the tang 110 and the axial slot 114, axially and rotationally locks the collar 42$_a$ to the spring 90.

It can be seen that the inner, larger diameter end portion of the spring 90 is cantilevered relative to the outer end portion of the spring defined by the smaller diameter coils 94. Such inner end portion of the spring 90 normally maintains the collar 42$_a$ in a laterally outwardly spaced relationship with the shaft 16. However, when a hand control force is exerted upon the hand grip section 36$_a$, the handle body 40$_a$ is caused to pivot about the collar 44$_a$ to thereby laterally deflect the cantilevered inner end portion of the spring 90. Such pivotal lateral deflection of the handle body may continue until the larger diameter end of the body is brought into contact with the shaft. At that point, a substantially larger hand force may be transmitted to the shaft in a manner similar to that described in conjunction with the handle 30.

The resilient damping member defined by the coiled spring 90, and the handle body 40$_a$, function in a similar manner to that of the handle body 40 and the elastomeric damping member 60 previously described to isolate the handgrip section 36$_a$ from shaft vibration transmitted to the clamp 92 and the collar 44$_a$. The clamp 92 functions to positionally lock the handle 30$_a$ on the shaft 16. However, simply by loosening the wing nut 106, the handle 30$_a$ can be slid along the shaft 16, and rotated relative thereto, to a re-oriented position on the shaft. The wing nut 106 may then be retightened to again lock the handle 30$_a$ on the shaft.

If desired, the interior surface bevel 56$_a$ on the slip fit collar 44$_a$ may be deleted so that the handle body 40$_a$ may be deflected about the collar 44$_a$ instead of being pivoted about such collar as previously described in conjunction with FIG. 5. If this modification is made to the handle 30$_a$ it is desirable to slightly reduce the wall thickness of its body 40$_a$ to facilitate this flexure of the body about the collar 44$_a$. If this design modification is effected, the handle body 40$_a$ functions as a cantilevered spring element to more efficiently damp shaft vibration transmitted to the slip-fit collar 44$_a$.

Figure 8:
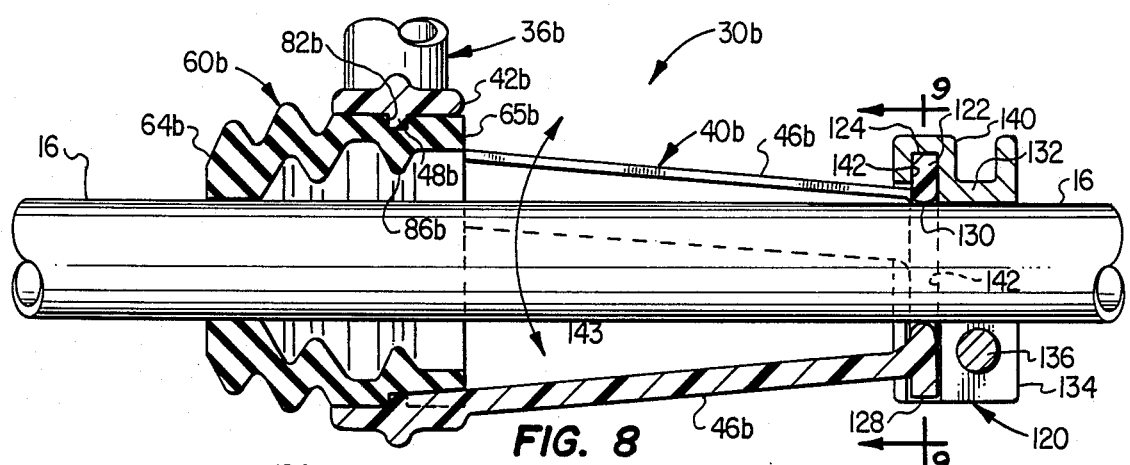
FIG. 8 is a cross-sectional view through a further alternate embodiment of the control handle.
Figure 9:
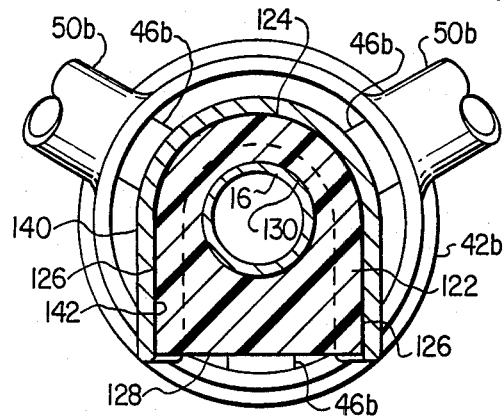
FIG. 9 is a cross-sectional view through a pivot clamp assembly portion of the control handle of FIG. 8 taken along line 9—9 thereof.
Figure 10:
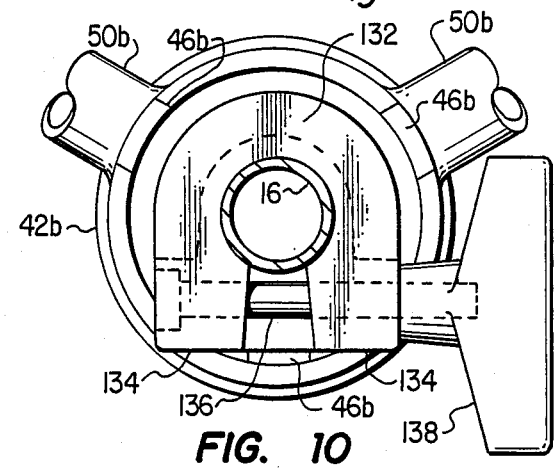
FIG. 10 is a rear elevational view of the pivot clamp assembly cross-sectionally depicted in FIG. 9.

Illustrated in FIGS. 8–10 is a further embodiment 30$_b$ of the control handle 30 in which elements similar to those in handle 30 have been given the same reference numerals, but with the subscript "b". The handle $30_b$ is similar in construction to the previously described handle 30 except that the clamping member 62 at the larger diameter end of the handle body 40 is deleted and is replaced with a specially designed pivot clamp assembly 120 positioned at the smaller diameter end of the handle body $40_b$. The interior grooves 80 are deleted from the forward end portion $64_b$ of the elastomeric damping member $60_b$ so that such forward end portion is in a slip-fit engagement with the shaft 16. In all other regards, the elastomeric damping member $60_b$ is identical to the previously described damping member 60 and has a circumferential groove $82_b$ in its cantilevered inner end portion $65_b$ which receives an internal annular flange $48_b$ formed on the collar $42_b$. The inner end portion $65_b$ is also provided with an annular interior stop rib $86_b$, and the handgrip section $36_b$ is secured to the collar $42_b$.

The circumferentially spaced, axially sloping connecting legs $46_b$ of the handle body $40_b$ terminate at the smaller diameter end of the handle body $40_b$ in a noncircular collar plate portion 122 which circumscribes the shaft 16 and has a rounded upper end surface 124, a pair of parallel, flat side surfaces 126, a flat bottom surface 128, and a rounded, annular interior surface 130 which circumscribes and engages the shaft 16.

The pivot clamp assembly 120 has a split body 132 which circumscribes the shaft 16 and is provided with a pair of clamp ear portions 134 which may be drawn together, by means of a bolt 136 extending through the ears and connected to a T-nut 138, to clamp the body 132 securely on the shaft 16. An inner end portion 140 of the clamp body 132 is provided with a recess 142 which receives, and is complementarily configured relative to, the collar plate 122. As may be best seen in FIG. 9, the noncircular, complementary configurations of the collar plate 122 and the slot 142 prevent the collar plate 122 (and thus the handle body $40_b$) from rotating relative to the clamp body 132 secured to the shaft 16.

However, as viewed in FIG. 8, the slot 142 tapers inwardly in an upward direction, and is slightly wider at its lower end than the thickness of the collar 122. At its upper end (as viewed in FIG. 8) the slot 142 relatively closely receives the collar 122, while at its lower end the slot 142 forms a clearance space on opposite sides of such collar. The upper end of the inner end portion 140 of the clamp body 132 thus prevents appreciable axial movement of the handle body $40_b$ relative to the clamp body, while the clearance space at the lower end of slot 142 permits the handle body $40_b$ to be laterally pivoted relative to the clamp body 132, as indicated by the double ended arrow 143 in FIG. 8, while the clamp body 132 restrains axial and rotation movement of the handle body $40_b$ relative to the shaft 16. This pivotal motion of the handle body $40_b$ relative to the clamp body 132 is facilitated by the rounded annular interior surface 130 of the collar plate 122. By simply loosening the T-nut 138, the handle $30_b$ may be slid along the shaft 16, and rotated relative thereto, to a re-oriented position on the shaft.

Figure 11:
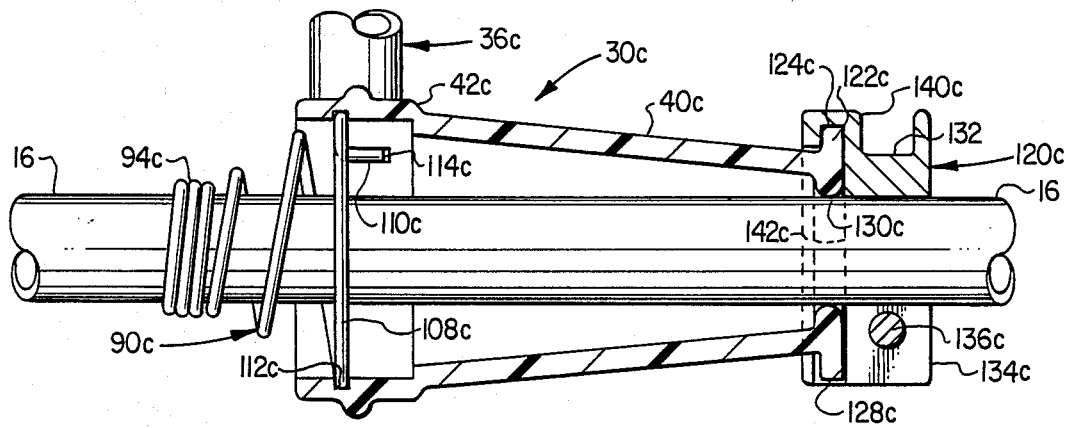
FIG. 11 is a cross-sectional view through a further alternate embodiment of the control handle.

A further embodiment $30_c$ of the handle 30 is cross-sectionally illustrated in FIG. 11 and is similar to the previously described handle embodiment $30_a$ except that the clamping band 92, and the outer tang portion 96 of the damping spring $90_c$ are deleted so that the outer end portion $94_c$ of the spring $90_c$ is in a slip-fit engagement with the shaft 16. The hollow, generally conically shaped body $40_c$ of the handle $30_c$ terminates at its smaller diameter end in a noncircular collar $122_c$ which is received in the complementarily configured recess of a clamping body $132_c$ similar to the clamping body 132 described in conjunction with FIGS. 8–10 and defining a portion of a pivot clamp assembly $120_c$. As in the case of the pivot clamp assembly 120, the pivot clamp assembly $120_c$ permits the handle body $40_c$ to be laterally pivoted about its smaller diameter end relative to the shaft 16 to thereby deflect the cantilevered inner end portion of the modified spring $90_c$.

Figure 12:
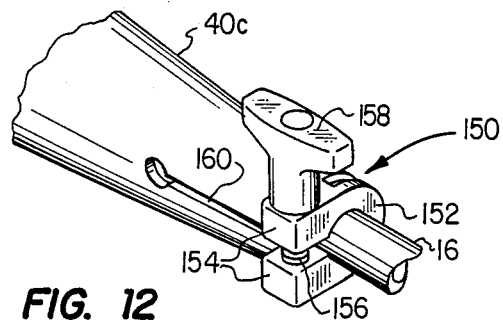
FIG. 12 is a fragmentary perspective end view of an alternate, rigid handle clamping mechanism which may be utilized in conjunction with the handle embodiments depicted in FIGS. 8 and 11.

In each of the handle embodiments $30_b$ and $30_c$ the slip-fit engagement as representatively depicted in FIG. 12, the pivot clamp assembly $120_c$ may be deleted and replaced with a rigid clamp assembly 150 which is molded integrally with the smaller diameter end of the hollow conical handle body $40_c$ to permit lateral flexure of the handle body about its smaller diameter end instead of pivotal motion. The molded-in clamp 150 comprises a split annular body 152 which circumscribes the shaft 16 and is provided with an opposed pair of clamp ear portions 154 which may be selectively drawn together to frictionally lock the body 152 on the shaft 16 by means of a conventional connecting bolt 156 which is extended through appropriate openings in the ears 154 and operatively connected to a T-nut member 158. Extending along the handle body $40_c$ from between the ears 154 is a conventional stress relief slot 160 which reduces stress on the handle body $40_c$ adjacent the clamp 150 when the ears 154 are drawn together.

The handle embodiment $30_b$ depicted in FIGS. 8–10 may be similarly modified by eliminating the pivot clamp assembly 120 and replacing it with a molded-in rigid clamp constructed similarly to the clamp 150. Utilization of a rigid clamp such as this causes the connecting legs $46_c$ to be laterally flexed relative to the rigid clamp, instead of being pivoted about the pivot clamp assembly 120, in response to lateral hand forces imposed upon the handle body.

From the foregoing it can be seen that the present invention provides substantially improved control handle apparatus for the trimmer 10 which markedly reduces the shaft vibration transmitted to the operator handgrip section of the control handle, the vibration being uniquely absorbed within the cantilevered damping member and the elongated handle body, particularly when such handle body is connected to the shaft for lateral flexure relative thereto. Additionally, because the handle body circumscribes the shaft an added measure of safety is provided to the control handle in the event that either of its two shaft connection portions is broken, or even if a portion of the handle body itself is broken. The improved handle, in its various depicted embodiments, is light in weight, relatively inexpensive to produce, provides substantially improved operator hand comfort, and may be easily and quickly adjusted to different positions along the shaft to selectively adjust the overall balance of the tool and the handle-to-handle length to suit various operators of the tool.

While the vibration-damping control handle of the present invention has been illustrated and described in conjunction with a flexible line trimmer, it will be readily appreciated that it may also advantageously be incorporated into a wide variety of rotary power tools of other types, such as lawn edgers, brush cutters, snow blowers and the like, as well as a variety of non-rotary portable power tools.

The foregoing detailed description is to be clearly understood as given by way of illustration and example only, the spirit and scope of the present invention being limited solely by the appended claims.

What is claimed is:

1. Vibration isolating handle apparatus connectable to a power tool shaft subject to vibration, comprising:
    an elongated body section having first and second opposite end portions;
    a handgrip section secured to said body section;
    means for connecting said second end portion of said body section to the shaft in a manner permitting said first end portion of said body section to be moved laterally toward and away from said shaft and precluding appreciable lateral translational movement of said second end portion relative to the shaft;
    resilient damping means for connecting said first end portion of said body section to the shaft in a laterally spaced relationship therewith, and for absorbing shaft vibration and isolating said first end portion therefrom; and
    means for releasably locking said body section to the shaft in a predetermined orientation relative thereto,
    one of said means for connecting and said resilient damping means being operative in a manner such that said shaft and one of said second end portion and said resilient damping means are axially slidable relative to one another during power tool operation to thereby significantly reduce shaft vibration transmitted to said one of said second end portion and said resilient damping means.

2. The handle apparatus of claim 1 wherein:
    said resilient damping means comprise a damping member having a first portion connectable to the shaft in a spaced relationship with said first end portion of said body section, and a second portion connectable to said first end portion of said body section in a laterally outwardly spaced relationship with the shaft.

3. The handle apparatus of claim 2 wherein:
    said first portion of said damping member is connectable to the shaft in a longitudinally spaced relationship with said first end portion of said body section, and
    said second portion of said damping member is cantilevered.

4. The handle apparatus of claim 2 wherein:
    said means for releasably locking said body section to the shaft include a clamp member securable to the shaft, means for intersecuring said clamp member and said first portion of said damping member, and means for intersecuring said second portion of said damping member and said first end portion of said body section.

5. The handle apparatus of claim 4 wherein:
    said damping member is of an elastomeric material, has a hollow, generally cylindrical configuration, and is adapted to coaxially receive a longitudinal portion of the shaft,
    said first end portion of said body section is of an annular configuration and adapted to outwardly circumscribe a longitudinal portion of the shaft,
    said means for intersecuring said clamp member and said first portion of said clamping member include interlockable rib and groove means formed on said clamp member and a first end portion of said damping member, and
    said means for intersecuring said second portion of said damping member and said first end portion of said body section include interlockable rib and groove means formed on said first end portion of said body section and a second end portion of said damping member.

6. The handle apparatus of claim 1 wherein:
    said means for connecting said second end portion include an annular collar section on said second end portion, said collar section being adapted to coaxially receive a longitudinal portion of the shaft in a slip fit relationship therewith, the radially inner surface of said collar section having a radially flared, axially extending circumferential portion thereon.

7. The handle apparatus of claim 1 wherein:
    said first end portion of said body section has an annular configuration adapted to coaxially circumscribe the shaft in a laterally outwardly spaced relationship therewith,
    said second end portion of said body section has an annular configuration adapted to coaxially circumscribe the shaft in a slip fit relationship therewith, and
    said body section has an intermediate portion intersecured between said first and second end portions of said body section and positioned to overlie the shaft in a laterally outwardly spaced relationship therewith.

8. The handle apparatus of claim 9 wherein:
    said intermediate portion comprises a circumferentially spaced plurality of elongated leg members secured at opposite ends thereof to said first and second end portions of said body section.

9. The handle apparatus of claim 8 wherein:
    said intermediate portion is defined by three elongated leg members equally spaced about the circumferences of said first and second end portions of said body section.

10. The handle apparatus of claim 1 wherein:
    said means for connecting and said means for releasably locking include means for clamping said second end portion of said body section to the shaft.

11. The handle apparatus of claim 1 wherein:
    said means for connecting and said means for releasably locking include a clamp member connectable to the shaft and having a connecting portion adapted to pivotally and nonrotatably receive said second end portion of said body section.

12. The handle apparatus of claim 1 wherein:
    said body section is adapted to circumscribe the shaft.

13. The handle apparatus of claim 1 wherein:
    said means for releasably locking include means for anchoring said resilient damping means to the shaft, and
    said means for connecting permit axial movement of said second end portion of said body section relative to the shaft.

14. The handle apparatus of claim 13 wherein:
    said means for connecting further permit pivotal motion of said body section about said second end portion thereof.

15. The handle apparatus of claim 1 wherein:
    said resilient damping means are movable along the shaft, and
    said means for connecting include means for anchoring said second end portion of said body section to the shaft.

16. The handle apparatus of claim 15 wherein:
said means for anchoring permit pivotal movement of said body section relative thereto about said second end portion of said body section.

17. Vibration isolating handle apparatus connectable to a shaft subject to vibration, comprising:
an elongated body section having first and second opposite end portions;
a handgrip secured to said body section;
means for connecting said second end portion of said body section to the shaft in a manner permitting said first end portion of said body section to be moved laterally toward and away from shaft and restraining lateral movement of said second end portion relative to the shaft;
resilient damping means for connecting said first end portion of said body section to the shaft in a laterally spaced relationship therewith, and for absorbing shaft vibration and isolating said first end portion therefrom; and
means for releasably locking said body section to the shaft in a predetermined orientation relative thereto,
said resilient damping means comprising a damping member having a first portion connectable to the shaft in a spaced relationship with said first end portion of said body section, and a second portion connectable to said first end portion of said body section in a laterally outwardly spaced relationship with the shaft,
said means for releasably locking said body section to the shaft including a clamp member securable to the shaft, means for intersecuring said clamp member and said first portion of said damping member, and means for intersecuring said second portion of said damping member and said first end portion of said body section,
said damping member being a coiled spring adapted to coaxially receive a longitudinal portion of the shaft, said spring having a first end portion with an inner diameter slightly larger than the outer diameter of the shaft, and a larger diameter second end portion,
said means for intersecuring said clamp member and said first portion of said damping member including a first tang section extending outwardly from said first end portion of said spring and secured to said clamping member,
said first end portion of said body section being of an annular configuration and adapted to outwardly circumscribe a longitudinal portion of the shaft, the radially inner surface of said first end portion of said body section having an annular circumferential groove and a axially extending groove formed therein, and
said means for intersecuring said second portion of said damping member and said first end portion of said body section including a longitudinally outer coil of said second spring end portion adapted to be received in said annular circumferential groove, and a second tang section projecting outwardly from said inner coil and adapted to be received in said axially extending groove.

18. Vibration isolating handle apparatus connectable to a shaft subject to vibration, comprising:
an elongated body section having first and second opposite end portions;
a handgrip section secured to said body section;
means for connecting said second end portion of said body section to the shaft in a manner permitting said first end portion of said body section to be moved laterally toward and away from said shaft and restraining lateral movement of said second end portion relative to the shaft;
resilient damping means for connecting said first end portion of said body section to the shaft in a laterally spaced relationship therewith, and for absorbing shaft vibration and isolating said first end portion therefrom; and
means for releasably locking said body section to the shaft in a predetermined orientation relative thereto,
said resilient damping means comprising a damping member having a first portion connectable to the shaft in a spaced relationship with said first end portion of said body section, and a second portion connectable to said first end portion of said body section in a laterally outwardly spaced relationship with the shaft,
said means for releasably locking said body section to the shaft including a clamp member securable to the shaft, means for intersecuring said clamp member and said first portion of said damping member, and means for intersecuring said second portion of said damping member and said first end portion of said body section,
said damping member being of an elastomeric material, having a hollow, generally cylindrical configuration, and being adapted to coaxially receive a longitudinal portion of the shaft,
said first end portion of said body section being of an annular configuration and adapted to outwardly circumscribe a longitudinal portion of the shaft,
said means for intersecuring said clamp member and said first portion of said clamping member including interlocking rib and groove means formed on said clamp member and a first end portion of said damping member,
said means for intersecuring said second portion of said damping member and said first end portion of said body section including interlockable rib and groove means formed on said first end portion of said body section and a second end portion of said damping member, and
said damping member having an annular interior rib formed therein and adapted to engage the shaft when said second end portion of said damping member is laterally deflected in response to movement of said first end portion of said body section toward the shaft.

19. A power tool comprising:
a portion subject to vibration during operation of said power tool; and
handle means for supporting and controlling the motion of said power tool, said handle means including:
a vibration damping member connected to said portion subject to vibration and having a cantilevered free end portion spaced apart from and resiliently deflectable toward said portion subject to vibration,
an elongated handle body having a first and second opposite end portions, said first end portion being secured to said cantilevered free end portion of said vibration damping member, said second end portion being directly connected to said portion subject to vibration in a manner preventing appreciable relative lateral translational movement between said second end portion of said handle body and said portion subject to vibration, and a handgrip secured to said handle body and adapted to be grasped by an operator of said power tool.

20. The power tool of claim 19 wherein:
said second end portion of said handle body is pivotally connected to said portion subject to vibration.

21. The power tool of claim 19 wherein:
said second end portion of said handle body is rigidly connected to said portion subject to vibration, and said handle body is resiliently deflectable toward said portion subject to vibration.

22. The power tool of claim 19 wherein:
said vibration damping member is fixedly secured to said portion subject to vibration, and said second end portion of said handle body is connected to said portion subject to vibration for sliding movement relative thereto.

23. The power tool of claim 19 wherein:
said portion subject to vibration is a shaft, and said vibration damping member has a generally annular cross-section, circumscribes said shaft, and has an end portion connected to said first end portion of said handle body.

24. The power tool of claim 23 wherein:
said vibration damping member is of an elastomeric material.

25. The power tool of claim 19 wherein:
said portion subject to vibration is a shaft, and said first and second end portions of said handle body circumscribe said shaft.

26. The power tool of claim 19 wherein:
said portion subject to vibration is a shaft, and said handle body circumscribes said shaft.

27. A power tool comprising:
a portion subject to vibration during operation of said power tool; and
handle means for supporting and controlling the motion of said power tool, said handle means including:
a vibration damping member connected to said portion subject to vibration and having a free end portion spaced apart from and resiliently deflectable toward said portion subject to vibration,
an elongated handle body having first and second opposite end portions, said first end portion being secured to said cantilevered free end portion of said vibration damping member, said second end portion being connected to said portion subject to vibration, and
a handgrip secured to said handle body and adapted to be grasped by an operator of said power tool,
said portion subject to vibration being a shaft,
said vibration damping member having a generally annular cross-section, circumscribing said shaft, and having an end portion connected to said first end portion of said handle body,
said vibration member being a coiled spring.

28. A power tool comprising:
a portion subject to vibration during operation of said power tool; and handle means for supporting and controlling the motion of said power tool, said handle means including:
a resilient vibration damping member connected to said portion subject to vibration,
an elongated handle body having first and second opposite end portions,
a handgrip secured to said handle body and adapted to be grasped by an operator of said power tool,
means for connecting said first end portion of said handle body to said vibration damping member, and
means for pivotally connecting said second end portion of said handle body to said portion subject to vibration and holding said second end portion directly against said portion subject to vibration,
one of said damping member and said second portion of said handle body slidably engaging said portion of said power tool subject to vibration.

29. The power tool of claim 28 wherein:
said vibration damping member has a free end portion, and
said means for connecting said first end portion of said handle body to said vibration damping member include means for connecting said first end portion of said handle body to said free end portion of said vibration damping member.

30. The power tool of claim 29 wherein:
said free end portion of said vibration damping member is cantilevered.

31. The power tool of claim 29 wherein:
said vibration damping member has an opposite end portion connected to said portion subject to vibration and spaced longitudinally outwardly from said first end portion of said handle body.

32. The power tool of claim 31 wherein:
said portion subject to vibration is a shaft, and said vibration damping member has a hollow, generally cylindrical configuration, circumscribes said shaft, and is of an elastomeric material.

33. The power tool of claim 28 wherein:
said portion subject to vibration is a shaft, and said first and second end portions of said handle body circumscribe said shaft.

34. The power tool of claim 28 wherein:
said portion subject to vibration is a shaft, and said means for pivotally connecting include a clamp member releasably secured to said shaft, said clamp member having means for connecting said second end portion of said handle body to said clamp member in a manner permitting pivotal motion of said handle body about said second end portion relative to said shaft, but restraining said handle body against appreciable rotation about or movement along the axis of said shaft.

35. The power tool of claim 28 wherein:
said portion subject to vibration is a shaft, and said handle body circumscribes said shaft.

36. A power tool comprising:
a portion subject to vibration during operation of said power tool; and
handle means for supporting and controlling the motion of said power tool, said handle means including:
a resilient vibration damping member connected to said portion subject to vibration, an elongated handle body having first and second opposite end portions, a handgrip secured to said handle body and adapted to be grasped by an operator of said power tool, means for connecting said first end portion of said handle body to said vibration damping member, and means for pivotally connecting said second end portion of said handle body to said portion subject to vibration, said vibration damping member having a free end portion, said means for connecting said first end portion of said handle body to said vibration damping member including means for connecting said first end portion of said handle body to said free end portion of said vibration damping member, said vibration damping member having an opposite end portion connected to said portion subject to vibration and spaced longitudinally outwardly from said first end portion of said handle body, said portion subject to vibration being a shaft, and said vibration damping member being coiled spring element which circumscribes said shaft.

37. A power tool comprising:
an elongated shaft;
drive means, operatively connected to one end of said shaft, for generating rotational power;
rotationally drivable means operatively connected to the opposite end of said shaft;
means for transmitting rotational power from said drive means to said rotationally drivable means; and
handle means for holding and guiding said shaft, said handle means including:
  an elongated handle body extending longitudinally along said shaft and having a first end portion spaced laterally outwardly from said shaft and a second end portion connected to and directly engaging said shaft in a manner precluding appreciable relative lateral translational between said shaft and said second end portion, and permitting said first end portion of said handle body to be moved laterally toward and away from said shaft,
  a handgrip secured to said handle body and adapted to be grasped by an operator of said power tool, and
  resilient vibration damping means, interconnected between said shaft and said first end portion of said handle body, for absorbing shaft vibration and isolating said first end portion of said handle body from said shaft vibration.

38. The power tool of claim 37 wherein:
said resilient vibration damping means are interconnected in a cantilevered manner between said shaft and said first end portion of said handle body.

39. The power tool of claim 37 further comprising:
means for selectively adjusting the rotational and axial orientation of said handle means relative to said shaft.

40. The power tool of claim 39 wherein:
said means for selectively adjusting include a clamp member releasably secured to said shaft, and
said vibration damping means are interconnected between said clamp member and said first end portion of said handle body.

41. The power tool of claim 39 wherein:
said means for selectively adjusting include clamp means for clamping said second end portion of said handle body to said shaft.

42. The power tool of claim 39 wherein:
said means for selectively adjusting include a clamp member releasably secured to said shaft, said clamp member having a connecting portion which engages said second end portion of said handle body, restrains rotation and axial movement of said handle relative to said shaft and permits pivotal movement of said handle body relative to said clamp member about said second end portion of said handle body.

43. The power tool of claim 37 wherein:
said vibration damping means comprise a hollow, generally cylindrical elastomeric damping member which circumscribes said shaft.

44. The power tool of claim 37 wherein:
said second end portion of said handle body is connected to said shaft for movement relative thereto.

45. The power tool of claim 37 wherein:
said second end portion of said handle body is pivotally connected to said shaft.

46. The power tool of claim 37 wherein:
said handle body circumscribes said shaft.

47. A power tool comprising:
an elongated shaft;
drive means, operatively connected to one end of said shaft, for generating rotational power;
rotational drivable means operatively connected to the opposite end of said shaft;
means for transmitting rotational power from said drive means to said rotationally drivable means; and
handle means for holding and guiding said shaft, said handle means including:
  an elongated handle body extending longitudinally along said shaft and having a first end portion spaced laterally outwardly from said shaft and a second end portion connected to said shaft,
  a handgrip secured to said handle body and adapted to be grasped by an operator of said power tool, and
  resiliently vibration damping means, interconnected between said shaft and said first end portion of said handle body, for absorbing shaft vibration and isolating said first end portion of said handle body from said shaft vibration, said vibration damping means comprising a coiled spring element circumscribing said shaft.

* * * * *